(12) United States Patent
Honda et al.

(10) Patent No.: US 9,381,942 B2
(45) Date of Patent: Jul. 5, 2016

(54) REAR VEHICLE BODY STRUCTURE OF VEHICLE

(71) Applicant: MAZDA MOTOR CORPORATION, Hiroshima (JP)

(72) Inventors: Masanori Honda, Hiroshima (JP); Yuki Toyama, Aki-gun (JP); Motoki Esumi, Hiroshima (JP); Koji Yoshimura, Hiroshima (JP); Sakayu Terada, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/759,167

(22) PCT Filed: Oct. 17, 2014

(86) PCT No.: PCT/JP2014/077744
§ 371 (c)(1),
(2) Date: Jul. 2, 2015

(87) PCT Pub. No.: WO2015/068556
PCT Pub. Date: May 14, 2015

(65) Prior Publication Data
US 2015/0344074 A1    Dec. 3, 2015

(30) Foreign Application Priority Data
Nov. 7, 2013   (JP) .................................. 2013-230797

(51) Int. Cl.
*B62D 21/15*   (2006.01)
*B62D 25/08*   (2006.01)

(52) U.S. Cl.
CPC ............ *B62D 21/155* (2013.01); *B62D 21/152* (2013.01); *B62D 25/087* (2013.01)

(58) Field of Classification Search
CPC .... B62D 21/152; B62D 21/155; B62D 21/15; B62D 25/08; B62D 25/087; B62D 25/20; B62D 25/2027; B62D 25/2036
USPC ............. 296/187.08, 187.11, 193.07, 193.08, 296/203.04, 204
See application file for complete search history.

(56) References Cited

U.S. PATENT DOCUMENTS 6,349,953 B1 * 2/2002 Yoshihira ................ B60G 7/02
280/124.109
2004/0183340 A1 * 9/2004 Tomita ............... B62D 25/2018
296/204

(Continued)

FOREIGN PATENT DOCUMENTS

JP    H08-175421 A    7/1996
JP    H09-175439 A    7/1997

(Continued)

OTHER PUBLICATIONS

International Search Report; PCT/JP2014/077744; Jan. 13, 2015.

*Primary Examiner* — Gregory Blankenship
(74) *Attorney, Agent, or Firm* — Studebaker & Brackett PC

(57) ABSTRACT

Disclosed is a rear vehicle body structure of a vehicle, which comprises a rear floor panel, and a rear side frame joined to a lower surface of the rear floor panel to extend in a front-rear direction. A bottom wall of the rear side frame has a bottom reinforcing portion formed to protrude upwardly or downwardly, and a standing wall of the rear side frame located on a vehicle-widthwise inner side has a side reinforcing portion formed to protrude outwardly in the vehicle width direction. The bottom reinforcing portion includes a top, an outer inclined section extending from the top obliquely outwardly in the vehicle width direction, and an inner inclined section extending from the top obliquely inwardly in the vehicle width direction, wherein the inner inclined section has an inclination angle less than an inclination angle of the outer inclined section.

8 Claims, 7 Drawing Sheets

(56) References Cited

U.S. PATENT DOCUMENTS

| | | | |
|---|---|---|---|
| 2004/0195865 A1* | 10/2004 | Tomita | B62D 21/09 296/203.04 |
| 2006/0202519 A1* | 9/2006 | Latimer, III | B62D 25/2036 296/203.04 |
| 2009/0085380 A1* | 4/2009 | Sakamoto | B62D 25/2027 296/193.08 |
| 2010/0072787 A1* | 3/2010 | Abe | B62D 25/087 296/203.04 |
| 2011/0175401 A1 | 7/2011 | Fujimura | |
| 2011/0215617 A1* | 9/2011 | Izutsu | B62D 21/152 296/203.04 |
| 2011/0272969 A1* | 11/2011 | Mori | B62D 25/20 296/193.07 |
| 2011/0278880 A1* | 11/2011 | Tsuyuzaki | B60J 5/0425 296/187.11 |
| 2015/0001887 A1* | 1/2015 | Saje | B62D 25/025 296/193.08 |
| 2015/0091333 A1* | 4/2015 | Mildner | B62D 21/02 296/193.07 |
| 2015/0344074 A1* | 12/2015 | Honda | B62D 21/155 296/187.11 |

FOREIGN PATENT DOCUMENTS

| | | |
|---|---|---|
| JP | 2004-306809 A | 11/2004 |
| JP | 2005-231477 A | 9/2005 |
| JP | 2007-083840 A | 4/2007 |
| JP | 2011-143881 A | 7/2011 |
| JP | 2012-001023 A | 1/2012 |

* cited by examiner (COMPARATIVE EXAMPLE)

REAR VEHICLE BODY STRUCTURE OF VEHICLE

TECHNICAL FIELD

The present invention relates to a rear vehicle body structure of a vehicle.

BACKGROUND ART

In a vehicle, particularly, an automotive vehicle having a monocoque body, with a view to enhancing strength of a rear of a vehicle body, a pair of right and left rear side frames each extending in a front-rear direction of the vehicle are commonly joined to a lower surface of a rear floor panel. Each of the rear side frames is formed in a cross-sectionally angular C shape opened upwardly, to form a closed cross-section in cooperation with the rear floor panel.

Absorption of collision energy during a rear collision of a vehicle (when the vehicle undergoes collision from behind) is primarily undertaken by such rear side frames. In order to effectively perform the absorption of collision energy during a rear collision, the following Patent Literature proposes to set an axial compression stiffness (rigidity) of a vehicle-widthwise outer portion of a rear side frame to become less than an axial compression stiffness of a vehicle-widthwise inner portion of the rear side frame, to thereby cause the rear side frame to be bent inwardly (to be deformed to protrude inwardly in the vehicle width direction) during a rear collision.

However, from the view point of energy absorption fully utilizing longitudinal deformation (deformation in the front-rear direction) of the rear side frame, it is undesirable to cause the rear side frame to be bent inwardly during a rear collision as described in the Patent Literature 1. Thus, there remains a need for improvement.

In order to effectively absorb collision energy during a rear collision by utilizing the longitudinal deformation of the rear side frame, it has been studied to form a bottom reinforcing portion in a bottom wall of the rear side frame to extend in the front-rear direction. The formation of the bottom reinforcing portion provides enhanced longitudinal strength (strength in the front-rear direction) of the rear side frame, so that it becomes possible to increase a maximum bending load (maximum reaction force), in a load-deformation characteristic indicative of a longitudinal deformation amount of the rear side frame depending on a magnitude of a load during a rear collision.

As the bottom reinforcing portion, it is conceivable to form a V-shaped protruding portion in a part of the bottom of the rear side frame. In this case, the bottom reinforcing portion is typically formed in a bilaterally symmetric shape with respect to a top (ridge) thereof at which a protruding amount is maximized. That is, the bottom reinforcing portion has an outer inclined section and an inner inclined section on respective right and left sides with respect to the top, wherein each of the inclined sections is formed to be inclined at the same angle.

In order to further enhance the collision energy absorption performance based on this rear side frame, it has also been studied to additionally form a side reinforcing portion protruding toward an inside of the cross-section of the rear side frame (protruding outwardly in the vehicle width direction), in an inner standing wall (standing wall located on a vehicle-widthwise inner side) of the rear side frame. The formation of the side reinforcing portion makes it possible to further enhance the maximum bending load of the rear side frame.

However, it was found that, in the case where both of the bottom reinforcing portion and the side reinforcing portion are formed in the above manner, although the maximum bending load of the rear side frame is significantly increased, a bending load after reaching the maximum bending load is not increased as large as expected. As a result of researches on the cause, it was found that, although the side reinforcing portion formed in the inner standing wall increases the maximum bending load, a bending load after reaching the maximum bending load is not sufficiently ensured due to buckling of the side reinforcing portion. That is, it was found that the bending load (reaction force) after reaching the maximum bending load is lower in the inner standing wall than that in an outer standing wall (standing wall located on a vehicle-widthwise outer side). Thus, after reaching the maximum bending load during a rear collision, the inner standing wall is more likely to undergo buckling by an inwardly-oriented component (component force oriented inwardly in the vehicle width direction) of a buckling force input into the inner inclined section of the bottom reinforcing portion. For this reason, the rear side frame is undesirably deformed inwardly (bent inwardly) in the vehicle width direction, resulting in failing to sufficiently ensure the bending load after reaching the maximum bending load.

CITATION LIST

Patent Literature

Patent Literature 1: JP 2005-231477A

SUMMARY OF INVENTION

The present invention has been made in view of the above circumstances, and an object thereof is to provide a rear vehicle body structure of a vehicle, capable of increasing a maximum bending load of a rear side frame, and sufficiently ensuring a bending load after reaching the maximum bending load.

In order to achieve the above object, the present invention provides a rear vehicle body structure of a vehicle, which comprises a rear floor panel, and a pair of right and left rear side frames provided on a lower surface of the rear floor panel to extend in a front-rear direction of the vehicle. Each of the rear side frames includes a bottom wall, a pair of standing walls extending upwardly from respective right and left edges of the bottom wall, and an opening formed between the standing walls and opened upwardly, wherein the standing walls have upper ends joined to the rear floor panel to thereby form a closed cross-section between the rear side frame and the rear floor panel to extend in the front-rear direction. The bottom wall of the rear side frame has a bottom reinforcing portion formed in at least a partial region thereof in the front-rear direction to protrude upwardly or downwardly, and one of the standing walls of the rear side frame located on a vehicle-widthwise inner side has a side reinforcing portion formed in at least a partial region thereof in the front-rear direction to protrude outwardly in the vehicle width direction. The bottom reinforcing portion includes, in cross-sectional view, a top at which an upwardly or downwardly protruding amount is maximized, an outer inclined section extending from the top obliquely outwardly in the vehicle width direction, and an inner inclined section extending from the top obliquely inwardly in the vehicle width direction, wherein the inner inclined section have an inclination angle less than an inclination angle of the outer inclined section.

The present invention can increase a maximum bending load of a rear side frame, and sufficiently ensure a bending load after reaching the maximum bending load.

Description of Embodiments

Figure 1:
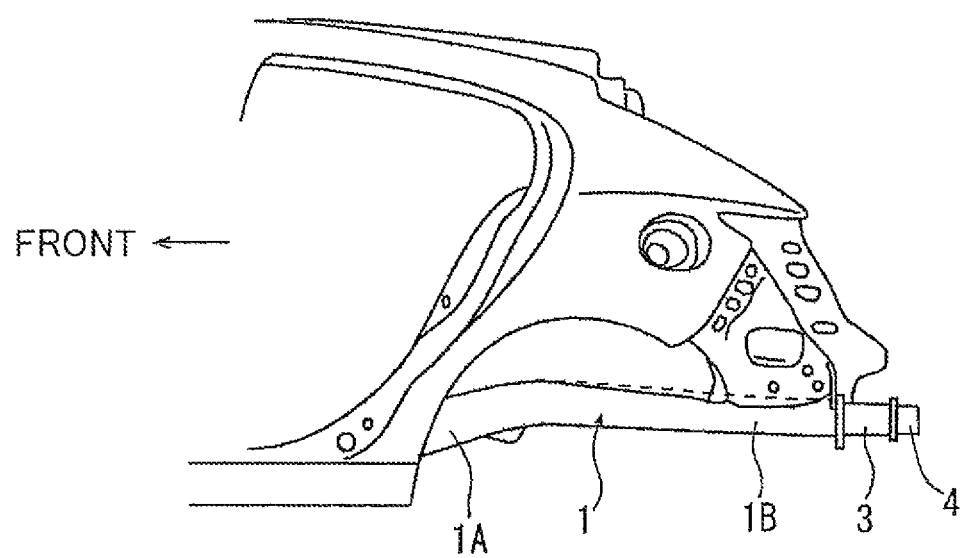
FIG. 1 is a side view illustrating a rear of a vehicle body to which the present invention is applied, in a state after a rear bumper is detached therefrom.
Figure 2:
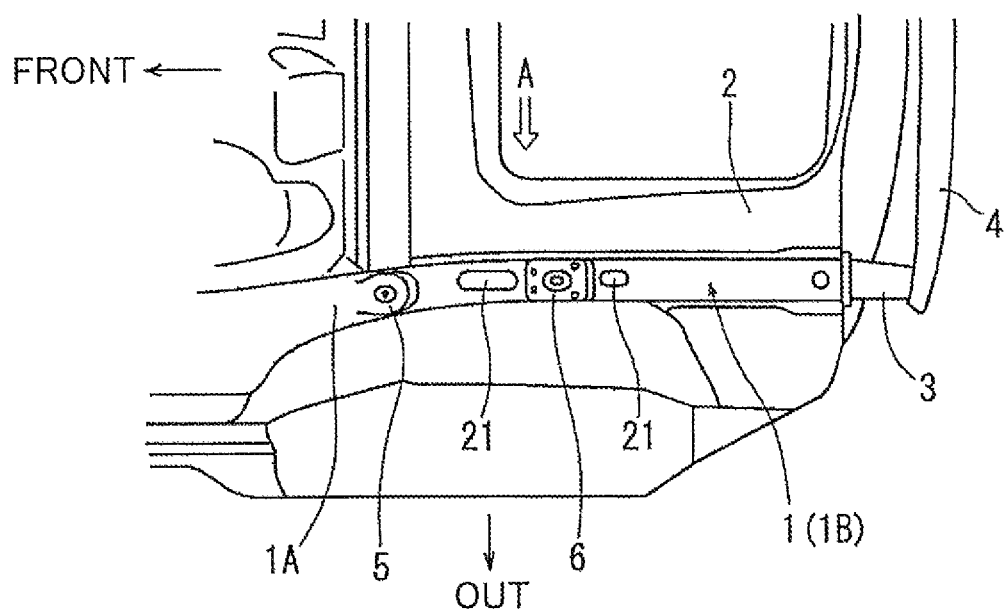
FIG. 2 is a bottom view of the rear of the vehicle body illustrated in FIG. 1.
Figure 5:
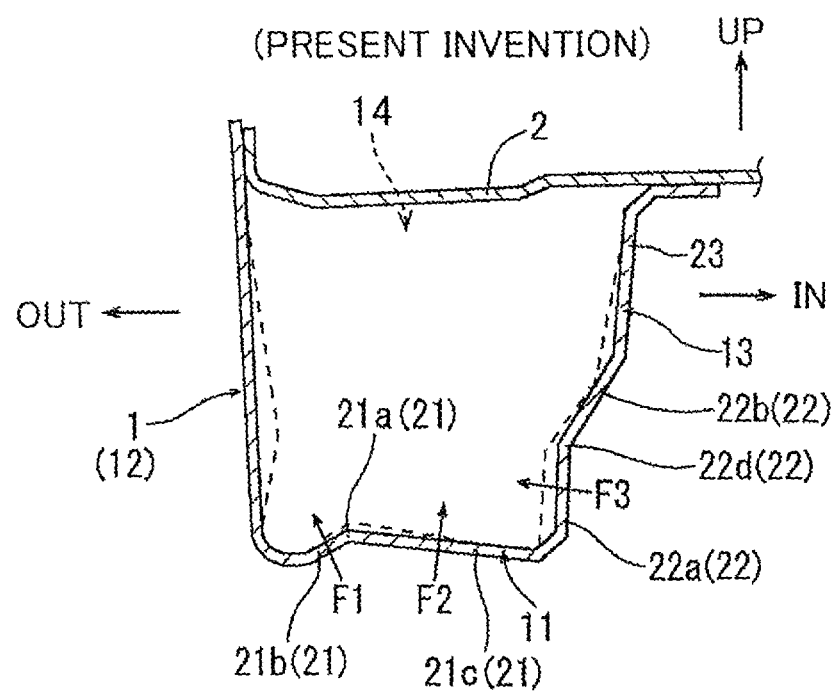
FIG. 5 is a sectional view illustrating one example of the rear side frame to which the present invention is applied.

As illustrated in FIGS. 1 and 2, a rear of a vehicle body is provided with a pair of right and left rear side frames 1 each extending in a front-rear direction of a vehicle. As illustrated in FIG. 5, each of the rear side frames 1 is a cross-sectionally angular C-shaped member having an opening 14 oriented upwardly. An opening-defining edge portion (upper ends of aftermentioned standing walls 12, 13) of the rear side frame 1 is joined to a lower surface of a rear floor panel 2, so that a closed cross-section is formed between the rear side frame 1 and the rear floor panel 2 to extend in the front-rear direction. This closed cross-section structure makes it possible to enhance rigidity (stiffness) of the rear of the vehicle body.

Figure 3:
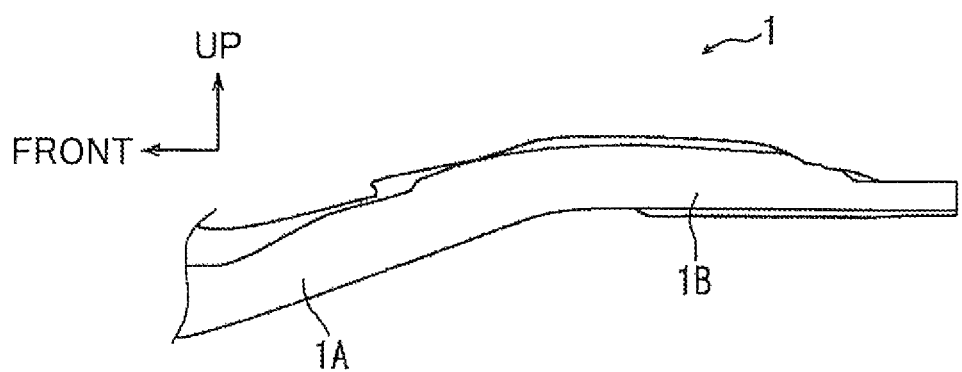
FIG. 3 is a side view of a rear side frame to which the present invention is applied.

As illustrated in FIGS. 1 and 3, the rear side frame 1 integrally has a front portion 1A and a rear portion 1B, in side view. The front portion 1A is formed such that it extends obliquely upwardly and rearwardly, i.e., a height position thereof gradually becomes higher toward a rear side of the vehicle. The rear portion 1B is provided rearward of the front portion 1A in continuous relation to the front portion 1A to extend approximately horizontally and linearly. The rear side frame 1 has a rear end to which a rear bumper 4 is attached through a crush can 3.

As illustrated in FIG. 2, the rear side frame 1 has a front mounting portion 5 and a rear mounting portion 6 each provided on a lower surface thereof. The front mounting portion 5 is provided in the front portion 1A, and the rear mounting portion 6 is provided in the rear portion 1B at a position adjacent to the front portion 1A. Each of the mounting portions 5, 6 is configured to allow an illustration-omitted suspension member to be attached thereto.

Details of the rear side frame 1 will be described with reference to FIG. 5. The rear side frame includes a bottom wall 11, a standing wall 12 extending upwardly from a vehicle-widthwise outer edge of the bottom wall 11, and a standing wall 13 extending upwardly from a vehicle-widthwise inner edge of the bottom wall 11, wherein an opening 14 is formed between upper ends of the standing walls 12, 13. The standing wall 12 located on a vehicle-widthwise outer side and the standing wall 13 located on a vehicle-widthwise inner side will hereinafter be referred to respectively as "the outer standing wall 12" and "the inner standing wall 13".

Figure 4:
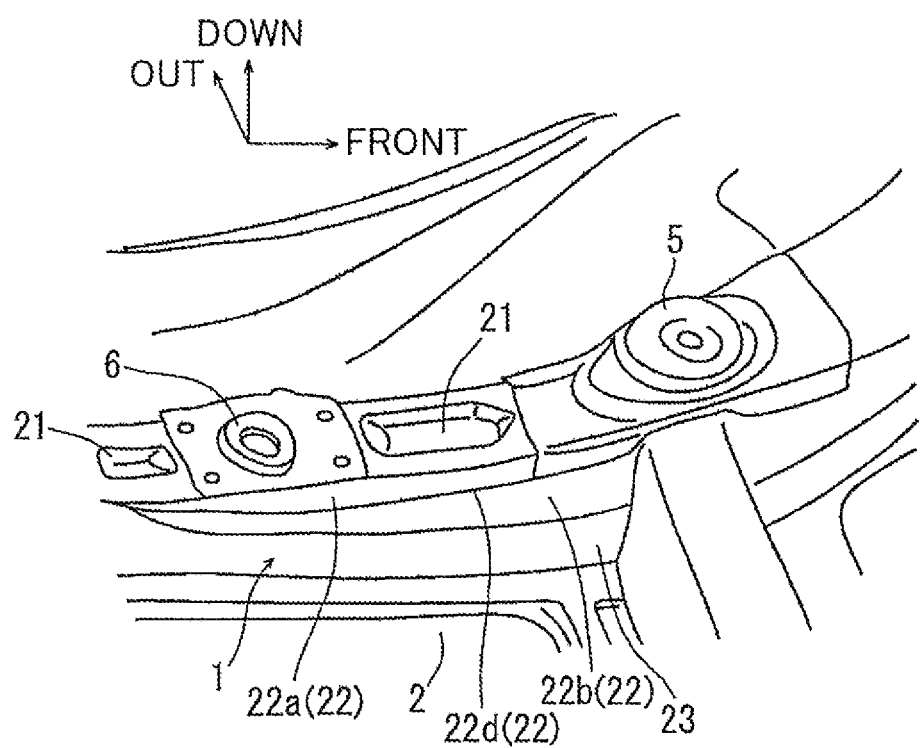
FIG. 4 is a view taken in the direction indicated by the arrowed line A in FIG. 2.

The bottom wall 11 has two bottom reinforcing portions 21 formed in respective areas thereof located across the rear mounting portions 6 in the front-rear direction to protrude toward an inside of the cross-section of the rear side frame 1 (upwardly). One of the bottom reinforcing portions 21 is formed in a positional range including a boundary area between the front portion 1A and the rear portion 1B, as illustrated in FIGS. 2 and 4.

In the sectional view illustrated in FIG. 5, the bottom reinforcing portion 21 includes: a top 21a at which an upwardly protruding amount is maximized; and an outer inclined section 21b and an inner inclined section 21c provided on vehicle-widthwise opposite sides of the top 21a. The outer inclined section 21b connects the top 21a and the vehicle-widthwise outer edge of the bottom wall 11, and inclines such that a height position thereof gradually becomes higher toward the top 21a. The inner inclined section 21c connects the top 21a and the vehicle-widthwise inner edge of the bottom wall 11, and inclines such that a height position thereof gradually becomes higher toward the top 21a.

The top 21a of the bottom reinforcing portion 21 is set at a position offset outwardly in the vehicle width direction with respect to a widthwise center of the bottom wall 11 of the rear side frame 1. Thus, the bottom reinforcing portion 21 is configured such that the inner inclined section 21c has a widthwise length greater than a widthwise length of the outer inclined section 21b. In other words, the inner inclined section 21c has an inclination angle less than an inclination angle of the outer inclined section 21b.

The inner standing wall 13 of the rear side frame 1 also has a side reinforcing portion 22 formed to protrude toward the inside of the cross-section of the rear side frame 1 (outwardly in the vehicle-width direction). More specifically, in the cross-sectional view, the side reinforcing portion 22 includes: an upstanding section 22a extending upwardly and approximately linearly from the vehicle-widthwise inner edge of the bottom wall 11; an inclined section 22b extending from an upper edge of the upstanding section 22a obliquely upwardly and inwardly in the vehicle width direction; and a ridge section 22d formed in a boundary area between the upstanding section 22a and the inclined section 22b to extend in the front-rear direction. Further, above the side reinforcing portion 22, an upper upstanding portion 23 is formed to extend upwardly and approximate linearly from an upper edge of the inclined section 22b.

As illustrated in FIG. 4, the side reinforcing portion 22 continuously extends over a given range in the front-rear direction, specifically, extends from a position adjacent to a rear end of the front mounting portion 5 to a position adjacent to a rear end of the rear bottom reinforcing portion 21 through a position corresponding to the front bottom reinforcing portion 21.

In the cross-sectional view, the outer standing wall 12 of the rear side frame 1 is formed in an approximately planar shape extending in an up-down direction, so as to provide convenience in installing a component associated with a brake.

In the above embodiment, the formation of the bottom reinforcing portions 21 and the side reinforcing portion 22 provides sufficiently enhanced strength (particularly, bending strength) of the rear side frame 1, so that it becomes possible to obtain an advantage of being able to avoid the occurrence of buckling at a premature stage to enhance an energy absorbing effect during a rear collision of the vehicle. This point will be described in detail below.

In the event of a rear collision, as a force acting to cause the rear side frame 1 to undergo buckling, three forces F1, F2, F3 illustrated in FIG. 5 are applied to respective sections. Specifically, the force F1 oriented upwardly and outwardly in the vehicle width direction is applied to the outer inclined section 21b, the force F2 oriented upwardly and inwardly in the vehicle width direction is applied to the inner inclined section 21c, and the force F3 oriented approximately horizontally and outwardly in the vehicle width direction is applied to the upstanding section 22a. In FIG. 5, the broken line indicates the rear side frame in a state after it is deformed during the rear collision.

The force F2 applied to the inner inclined section 21c acts, based on a component thereof oriented inwardly in the vehicle width direction, as a force which could cause the rear side frame 1 to be bent inwardly in the vehicle width direction. However, the component force acting to cause the inward bending is small, because the inclination angle of the inner inclined section 21c is small. By an interaction between this small component force and the outwardly-oriented force F3 applied to the upstanding section 22a, the inner standing wall 13 tends to be slightly deformed outwardly in the vehicle width direction. This makes it possible to maintain a longitudinal center line (center line extending in the front-rear direction) of the rear side frame 1 in an approximately linear state so as to prevent or suppress the inward bending.

Regarding the rear side frame 1 according to this embodiment, which has the bottom reinforcing portions 21 and the side reinforcing portion 22 as shown in FIG. 5, a relationship between a load and a deformation amount during a rear collision (load-deformation characteristic) was checked. A result thereof is presented in FIG. 7. As indicated by the solid line in FIG. 7, in this embodiment, a maximum bending load (maximum reaction force) is significantly increased, and a bending load (reaction force) after reaching the maximum bending load is sufficiently ensured.

Figure 6:
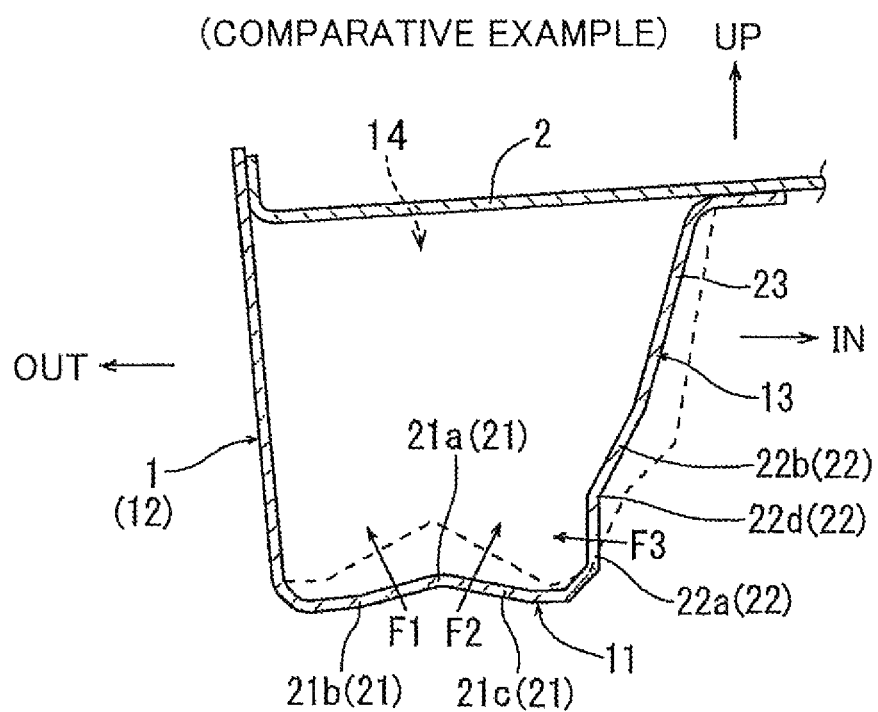
FIG. 6 is a sectional view illustrating a comparative example, in a state corresponding to FIG. 5.

FIG. 6 illustrates a comparative example. In FIG. 6, the same element as that illustrated in FIG. 5 is assigned with the same reference numeral or sign. In the comparative example illustrated in FIG. 6, the top 21a of each of the bottom reinforcing portions 21 is set at a position approximately coincident with the widthwise center of the bottom wall 11 of the rear side frame 1. That is, the widthwise length of the inner inclined section 21c is shortened, as compared to the embodiment in FIG. 5, and the inclination angle of the inner inclined section 21c is increased, as compared to the embodiment in FIG. 5. This means that the inwardly-oriented component of the force F2 applied to the inner inclined section 21c is increased, as compared to the embodiment in FIG. 5. Therefore, as indicated by the broken line in FIG. 6, during a rear collision, the inner standing wall 13 is largely deformed inwardly in the vehicle width direction, as a whole.

Figure 7:
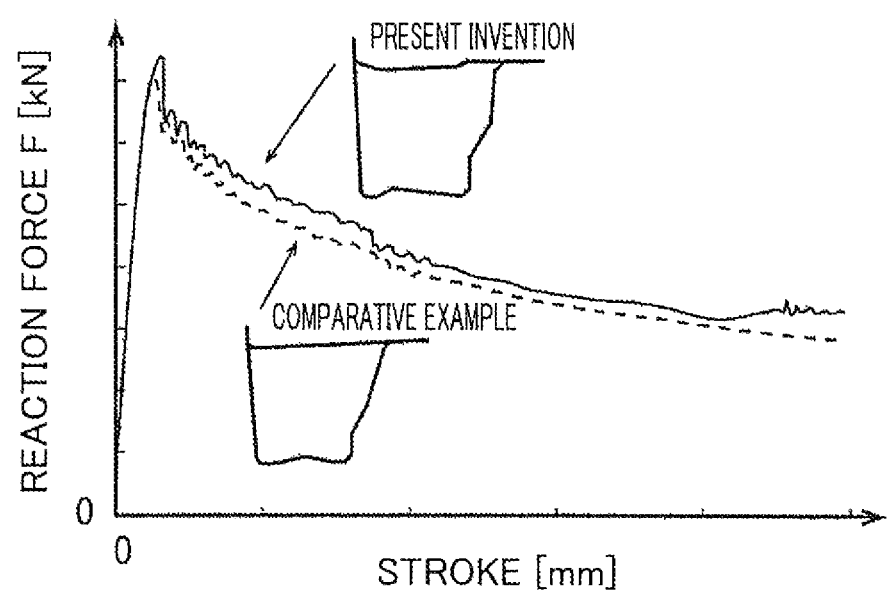
FIG. 7 is a characteristics graph presenting respective load-deformation characteristics of the present invention and the comparative example.

A load-deformation characteristic of the comparative example illustrated in FIG. 6 is indicated by the broken line in FIG. 7. In the comparative example, as compared to the embodiment illustrated in FIG. 5, the maximum bending load decreases, and the bending load after reaching to the maximum bending load also decreases. However, it is to be understood that, as compared to a structure having only the bottom reinforcing portions 21 without the side reinforcing portion 22, even the comparative example can increase the maximum bending load and the bending load after reaching to the maximum bending load.

Although the present invention has been described based on one embodiment thereof, it should be noted that the present invention is not limited to the above embodiment, but various changes and modifications may be made therein without departing from the spirit and scope thereof as set forth in appended claims. For example, instead of the above embodiment in which the side reinforcing portion 22 is provided in only the inner standing wall 13, the side reinforcing portion may be provided in each of the inner standing wall 13 and the outer standing wall 12. Further, instead of the above embodiment in which the upwardly-protruding bottom reinforcing portion 21 is provided, a downwardly-protruding bottom reinforcing portion may be provided. In the above embodiment, the two bottom reinforcing portions 21 are provided in respective areas located across the rear mounting portions 6 in the front-rear direction. Alternatively, a single bottom reinforcing portion may be provided to continuously extend over the front portion 1A and the rear portion 1B of the rear side frame 1, or three or more bottom reinforcing portions separated from each other in the front-rear direction may be provided. Further, in the above embodiment, the single side reinforcing portion 22 is provided to continuously extend in the front-rear direction over a given range including all of the areas in which the bottom reinforcing portions 21 are formed. Alternatively, a plurality of side reinforcing portions separated from each other in the front-rear direction may be provided in the same manner as that in the bottom reinforcing portions 21. In this case, it is preferable that a positional relationships therebetween is set to allow each of the side reinforcing portions to be disposed in a position corresponding to at least a part of a respective one of the bottom reinforcing portions.

Further, an object of the present invention is not limited to the explicitly described one, but implicitly includes offering a matter substantially expressed as a favorable or advantageous point.

Last of all, distinctive features disclosed in the above embodiment and functions/effects based on the features will be outlined.

The above embodiment discloses a rear vehicle body structure of a vehicle, which comprises a rear floor panel, and a pair of right and left rear side frames provided on a lower surface of the rear floor panel to extend in a front-rear direction of the vehicle. Each of the rear side frames includes a bottom wall, a pair of standing walls extending upwardly from respective right and left edges of the bottom wall, and an opening formed between the standing walls and opened upwardly, wherein the standing walls have upper ends joined to the rear floor panel to thereby form a closed cross-section between the rear side frame and the rear floor panel to extend in the front-rear direction. The bottom wall of the rear side frame has a bottom reinforcing portion formed in at least a partial region thereof in the front-rear direction to protrude upwardly or downwardly, and one of the standing walls of the rear side frame located on a vehicle-widthwise inner side has a side reinforcing portion formed in at least a partial region thereof in the front-rear direction to protrude outwardly in the vehicle width direction. The bottom reinforcing portion includes, in cross-sectional view, a top at which an upwardly or downwardly protruding amount is maximized, an outer inclined section extending from the top obliquely outwardly in the vehicle width direction, and an inner inclined section extending from the top obliquely inwardly in the vehicle width direction, wherein the inner inclined section have an inclination angle less than an inclination angle of the outer inclined section.

In the above rear vehicle body structure, the formation of the bottom reinforcing portion and the side reinforcing portion makes it possible to significantly increase a maximum bending load of the rear side frame. In addition, the inclination angle of the inner inclined section is small, so that an inwardly-oriented component of a force applied to the inner inclined section upwardly and inwardly in the vehicle width direction during a rear collision decreases. When the component force decreases, the standing wall located on the vehicle-widthwise inner side becomes less likely to undergo buckling, so that it becomes possible to prevent or suppress a situation where the rear side frame undergoes bending deformation toward an inward side in the vehicle width direction (inward bending). This makes it possible to maintain a cross-sectional center line of the rear side frame in an approximately linear state to thereby sufficiently largely ensure a bending load after reaching the maximum bending load.

Preferably, in the above rear vehicle body structure, the bottom reinforcing portion has a shape protruding upwardly, wherein the top of the bottom reinforcing portion is offset outwardly in the vehicle width direction, with respect to a widthwise center of the bottom wall of the rear side frame, and thereby the inner inclined section has a widthwise length greater than a widthwise length of the outer inclined section.

In the rear vehicle body structure having this feature, it becomes possible to avoid a situation where, due to the formation of the bottom reinforcing portion, a height position of a lower surface of the rear side frame is unnecessarily lowered. In addition, it becomes possible to allow the inclination angles of the outer inclined section and the inner inclined section to become different from each other as desired, by a simple technique of offsetting the top of the bottom reinforcing portion toward an outside of the vehicle.

Preferably, in the above rear vehicle body structure, the side reinforcing portion includes, in cross-sectional view, an upstanding section extending upwardly and approximately linearly from a vehicle-widthwise inner edge of the bottom wall, and an inclined section extending from an upper edge of the upstanding section obliquely upwardly and inwardly in the vehicle width direction.

In the rear vehicle body structure having this feature, the side reinforcing portion can be formed while minimizing complexification of a cross-section of the rear side frame. This is desirable from the viewpoint of enhancement in productivity of the rear side frame.

In the case where each of the rear side frames includes a front portion extending obliquely upwardly and rearwardly, and a rear portion provided rearward of the front portion to extend approximately horizontally, it is preferable that the bottom reinforcing portion and the side reinforcing portion are formed in a positional range including a boundary area between the front portion and the rear portion.

In the rear vehicle body structure having this feature, it becomes possible to enhance strength of a portion of the rear side frame in which stress concentration is more likely to occur and thus bending is more likely to occur, to thereby effectively enhance energy absorption performance during a rear collision.

The invention claimed is:

1. A rear vehicle body structure of a vehicle, comprising a rear floor panel, and a pair of right and left rear side frames provided on a lower surface of the rear floor panel to extend in a front-rear direction of the vehicle, wherein:
    each of the rear side frames includes a bottom wall, a pair of standing walls extending upwardly from respective right and left edges of the bottom wall, and an opening formed between the standing walls and opened upwardly, the standing walls having upper ends joined to the rear floor panel to thereby form a closed cross-section between the rear side frame and the rear floor panel to extend in the front-rear direction;
    the bottom wall of the rear side frame has a bottom reinforcing portion formed in at least a partial region thereof in the front-rear direction to protrude upwardly or downwardly;
    one of the standing walls of the rear side frame located on a vehicle-widthwise inner side has a side reinforcing portion formed in at least a partial region thereof in the front-rear direction to protrude outwardly in the vehicle width direction; and
    the bottom reinforcing portion includes, in cross-sectional view, a top at which an upwardly or downwardly protruding amount is maximized, an outer inclined section extending from the top obliquely outwardly in the vehicle width direction, and an inner inclined section extending from the top obliquely inwardly in the vehicle width direction, the inner inclined section having an inclination angle less than an inclination angle of the outer inclined section.

2. The rear vehicle body structure as defined in claim 1, wherein:
    the bottom reinforcing portion has a shape protruding upwardly; and
    the top of the bottom reinforcing portion is offset outwardly in the vehicle width direction, with respect to a widthwise center of the bottom wall of the rear side frame, and thereby the inner inclined section has a widthwise length greater than a widthwise length of the outer inclined section.

3. The rear vehicle body structure as defined in claim 2, wherein the side reinforcing portion includes, in cross-sectional view, an upstanding section extending upwardly and approximately linearly from a vehicle-widthwise inner edge of the bottom wall, and an inclined section extending from an upper edge of the upstanding section obliquely upwardly and inwardly in the vehicle width direction.

4. The rear vehicle body structure as defined in claim 3, wherein:
    each of the rear side frames includes a front portion extending obliquely upwardly and rearwardly, and a rear portion provided rearward of the front portion to extend approximately horizontally; and
    the bottom reinforcing portion and the side reinforcing portion are formed in a positional range including a boundary area between the front portion and the rear portion.

5. The rear vehicle body structure as defined in claim 1, wherein the side reinforcing portion includes, in cross-sectional view, an upstanding section extending upwardly and approximately linearly from a vehicle-widthwise inner edge of the bottom wall, and an inclined section extending from an upper edge of the upstanding section obliquely upwardly and inwardly in the vehicle width direction.

6. The rear vehicle body structure as defined in claim 5, wherein:
    each of the rear side frames includes a front portion extending obliquely upwardly and rearwardly, and a rear portion provided rearward of the front portion to extend approximately horizontally; and
    the bottom reinforcing portion and the side reinforcing portion are formed in a positional range including a boundary area between the front portion and the rear portion.

7. The rear vehicle body structure as defined in claim 2, wherein:
    each of the rear side frames includes a front portion extending obliquely upwardly and rearwardly, and a rear portion provided rearward of the front portion to extend approximately horizontally; and the bottom reinforcing portion and the side reinforcing portion are formed in a positional range including a boundary area between the front portion and the rear portion.

8. The rear vehicle body structure as defined in claim 1, wherein:

each of the rear side frames includes a front portion extending obliquely upwardly and rearwardly, and a rear portion provided rearward of the front portion to extend approximately horizontally; and the bottom reinforcing portion and the side reinforcing portion are formed in a positional range including a boundary area between the front portion and the rear portion.

* * * * *